United States Patent [19]

Kerzich et al.

[11] Patent Number: 4,889,168
[45] Date of Patent: Dec. 26, 1989

[54] TUBING ANGLE BEND ASSEMBLY CLIP

[75] Inventors: Anthony A. Kerzich; Douglas M. McClure, both of Cadillac, Mich.

[73] Assignee: Cadillac Rubber & Plastics, Inc., Cadillac, Mich.

[21] Appl. No.: 238,041

[22] Filed: Aug. 29, 1988

[63] Related U.S. Application Data Continuation of Ser. No. 792,505 filed Oct. 29, 1985, abandoned.

[51] Int. Cl.⁴ .............................................. F16L 57/00
[52] U.S. Cl. .................................... 138/103; 138/110; 138/DIG. 8
[58] Field of Search ............... 138/103, 106, 110, 177, 138/178, 172, DIG. 8; 72/369

[56] References Cited

U.S. PATENT DOCUMENTS

| | | |
|---|---|---|
| 124,897 | 3/1872 | Honsinger . |
| 644,858 | 3/1900 | Greenfield . |
| 955,342 | 4/1910 | Maxwell . |
| 976,987 | 11/1910 | Corbridge . |
| 1,156,145 | 10/1915 | Jenkins . |
| 1,668,953 | 5/1928 | Erickson . |
| 1,975,045 | 9/1934 | Kossowski ............................ 72/369 |
| 2,147,124 | 2/1939 | Litle, Jr. . |
| 2,216,149 | 10/1940 | Weiss . |
| 2,769,999 | 11/1956 | Sheahan . |
| 3,790,418 | 2/1974 | Huvey et al. . |
| 3,853,148 | 12/1974 | DeVincent et al. . |
| 3,955,599 | 5/1976 | Walker . |
| 4,151,864 | 5/1979 | Thurman . |
| 4,320,783 | 3/1982 | Neal et al. . |

FOREIGN PATENT DOCUMENTS

| | | | |
|---|---|---|---|
| 808207 | 2/1937 | France | ................................. 72/369 |
| 808208 | 2/1937 | France | ................................. 72/369 |
| 831339 | 3/1960 | United Kingdom . | |
| 990210 | 4/1965 | United Kingdom . | |

Primary Examiner—James E. Bryant, III
Attorney, Agent, or Firm—Varnum, Riddering, Schmidt & Howlett

[57] ABSTRACT

A tubing angle bend assembly including a length of flexible tubing is provided with a clip mounting the tubing to bend the tubing through a pre-selected angle. The clip has an arcuate body and has radially inwardly extending retaining structure flanking either end for retaining the tube in resilient fit against the spine of the clip. A central retainer finger of the clip extends radially inwardly and beneath the tubing to maintain the tubing against the spine of the clip without collapsing the tubing. An opening between the central retainer finger and the spine of the clip allows resilient passage of the tubing into and out of the clip. Thus, the tubing is retained within the clip by the retaining structure and the central retainer finger to smoothly bend the tubing through the pre-selected angle.

15 Claims, 2 Drawing Sheets

TUBING ANGLE BEND ASSEMBLY CLIP

This is a continuation, of application Ser. No. 792,505 filed Oct. 29, 1985, now abandoned.

BACKGROUND OF THE INVENTION

Lengths of flexible tubing such as small rubber hoses are used in many-applications such as the automotive industry. In such applications, the hoses are often required to fit within confined spaces such as the area under the hood of an automobile. The hoses are accordingly designed with a number of acute angle bends. These acute angle bends can be formed in the hose by forming the green extruded hose into the acute angle bend with a mandrel and curing the hose to set the shape. Care must be taken in this curing and forming process to ensure that the hose does not collapse that the flow characteristics of the hose are not impaired. An alternate method of forming the acute angle bends is the process of bending the green hose around a bar and curing the hose in that condition.

Subsequent to the curing operation, the mandrel must typically be removed from the tubing and the tubing then cut to length. Where multiple bends are required in a particular hose, multiple hose segments are typically formed and are joined together with connectors in a straight or elbow configuration.

It is evident that the necessity of using curing operations utilizing a mandrel or bar especially in the case of multiple formation of hoses, is relatively expensive. In addition, it can be seen that the assembly costs necessitated by multiple formation of hoses is typically relatively expensive.

Another method of forming acute bends is by cutting the hose into segments and joining the segments with a conventional molded plastic conduit. This method involves an assembly operation which is somewhat time consuming and expensive.

SUMMARY OF THE INVENTION

According to the invention a length of flexible tubing is mounted to a one-piece resilient clip which bends the tubing through a pre-selected angle. The clip has a body which is bent in an arcuate configuration and which has a central portion with a substantially continuous spine on an inner radial surface therof. Radially inwardly extending retaining means flank either end of the clip central portion to form a partial tubular passage so as to resiliently retain the flexible tubing. A central retainer finger extends radially inwardly and beneath the tubing in firm contact to define a partial tubular passage and to maintain the tubing against the interior surface or spine of the clip. The retaining means and central retainer finger maintain the tubing in the desired arcuate relationship with the clip without collapsing the tubing. An access opening between the central retainer finger and the spine of the clip permit the tubing to pass resiliently into and out of the clip as desired. Access openings at the retaining means flanking either end of the central portion also allow the tubing to pass resiliently therethrough. The resilient material used to form the clip and the inherent flexibility of the flexible tubing facilitate this resilient mounting and demounting of the rubber tubing to the clip.

Preferably, the clip is integrally formed in one piece of a resilient plastic material. Further, the body of the clip is arcuate-shaped in cross-section and has a radius of curvature substantially the same as the radius of curvature of the outer surface of the length of flexible tubing.

The retainer means are typically formed by a pair of fingers which together with the spine extend more than 180 around the tubing. Further, the central retainer finger extends more than 180° around the tubing and is so configured so as to leave a slot between the end of the finger and the spine to allow the length of flexible tubing to pass resiliently therethrough. The body central portion has an opening juxtaposed to the central retainer finger to facilitate molding of the finger.

The invention also contemplates the use of a clip in a method of bending a length of flexible tubing through a preselected angle by inserting a length of flexible tubing through the access opening formed by the central retainer flange and the retaining means by resiliently expanding the access openings and/or resiliently deforming the tubing to position the tubing against the continuous spine of the clip. In this manner, the tube is simultaneously bent through the pre-selected angle.

The invention allows single and multiple bends to be formed in hoses without costly forming or assembly operations such as those typically required. The invention also achieves significant cost reduction by eliminating the necessity of assembly operations required when multiple bend portions are assembled according to the conventional method.

BRIEF DESCRIPTION OF THE DRAWINGS

The invention will be described with reference to the accompanying drawings wherein like members bear like reference numerals in which.

DESCRIPTION OF THE PREFERRED EMBODIMENT

Figure 1:
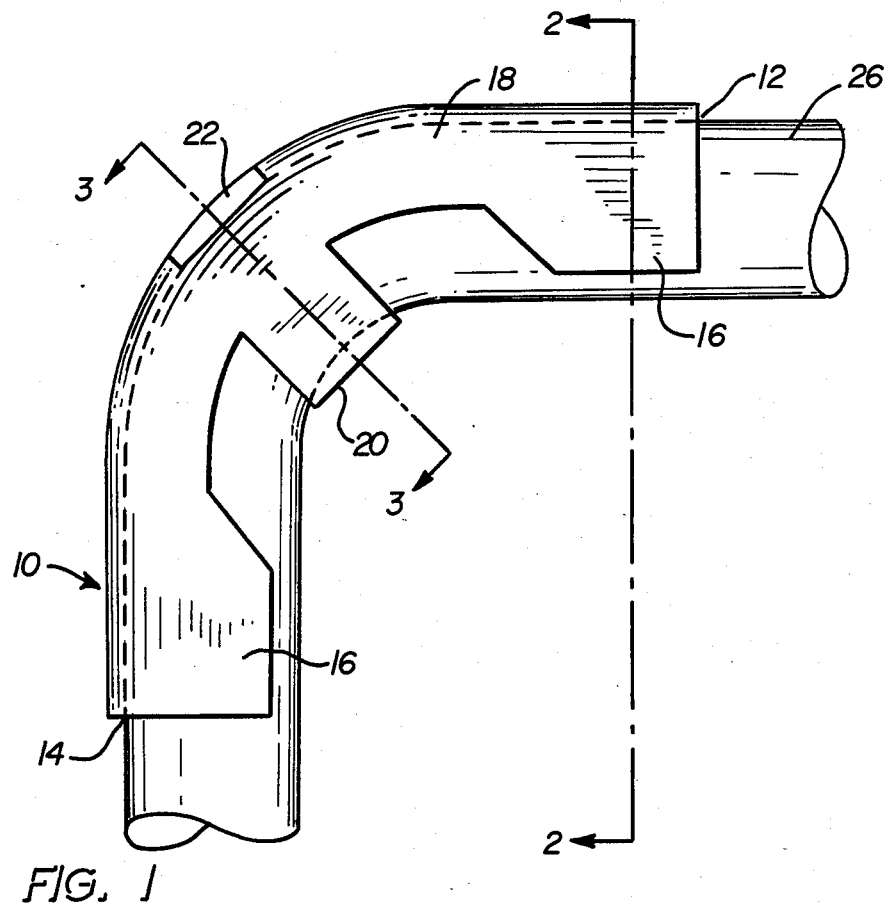
FIG. 1 is a side-view showing a bend clip according to the invention and a length of rubber tubing.

Referring now to the drawings, a tubing angle bend assembly according to the invention comprises a bend clip 10 and a length of rubber tubing 26. The clip 10 is a one-piece molded clip made of plastic or other material of suitable flexibility and resilience and has a generally arcuate configuration. A first end 12 of clip 10 is disposed perpendicular to a second end 14 of clip 10 and is joined by a curved central portion 18 forming a substantially continuous spine on an inner radial surface thereof. The length of rubber tubing 26 is in contact with the bend clip 10 and congruently assumes the generally arcuate configuration of the bend clip 10. Tangents drawn at the ends 12 and 14 define the angle through which the tubing is bent by the clip. In the embodiement shown in the drawings, the tubing is bent through an angle of about 90°.

End flanges or fingers 16 are formed as integral parts of each end 12, 14 of clip 10. The end flanges 16 of each end extend about 270° around the tubing at the ends to hold the tubing 26 in resilient fit relationship against the spine. The bend clip 10 includes a retaining flange 20 at a central portion of the clip 10 to maintain the tubing in firm contact with the spine without collapsing the tubing. The retaining flange 20 extends around and beneath the tubing 26 at the central portion thereof. The bend clip 10 has an aperture 22 at the central portion thereof.

The retaining flange 20 defines an opening with the spine to allow resilient passage of the tubing therethrough.

Figure 2:
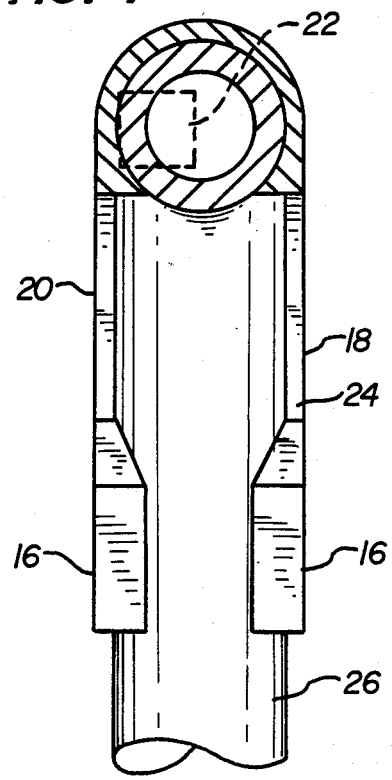
FIG. 2 is a cross-sectional view of the rubber tubing and bend clip taken along line 2—2 of FIG. 1.

With reference to FIG. 2, the clip 10 is of arcurate cross-sectional configuration. The inner radius of curvature of the lateral cross-sectional configuration is substantially equivalent to the outer radius of curvature of the rubber tubing 26. As seen in FIG. 2, the central portion 18 of the clip 10 extends partially around the rubber tubing, for example, about 180° except at the retaining flange 20, to support the side of the tubing 26 and prevent collapse thereof. At the ends 12 and 14, the clip extends about 270° around the tubing. The extent to which the clip surrounds the tubing 26 is gradually tapered from a maximum at the end flange 16 to a minimum at the central portion 18.

Figure 3:
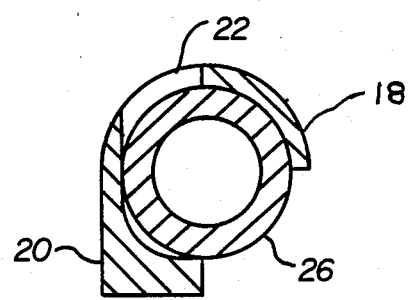
FIG. 3 is a cross-sectional view of the rubber tubing and bend clip taken along line 3—3 of FIG. 1.

As seen in FIG. 3, the shoulder 18 and retaining flange 20 of the clip 10 together define an arc of more than 180 degrees but less than 360 degrees. The flange 20 extends beneath the tubing to firmly hold the tubing against the inner surface of the clip. The aperture 22 extends through the clip. The aperture 22 is located in a central portion of the clip 10 to accommodate molding operations. In molding the clip, a core member extends through the aperture 22 to form the retaining flange 20.

In use, the rubber tubing is secured in the bend clip 10 and maintained at the desired degree of bend by means of the end flange 16 and supported lengthwise by the shoulder 18. The rubber tubing is introduced into the bend clip 10 at each end 12, 14 through the unenclosed area between each end flange 16. The material utilized to form the bend clip and/or the rubber tubing is of sufficient flexibility and resilience to allow the rubber tubing to be pressed between the end flanges 16, but yet to securely retain the tubing at the ends within the flanges 16. The material is also of sufficient resiliencey to permit the end flanges to return to their original position after the rubber tubing has been pressed into place, thus securely retaining the rubber tubing in the bend clip at the desired degree of bend. The rubber tubing is further maintained in the central portion of the clip by means of the retaining flange 20. The rubber tubing is introduced into the central portion of the clip through the opening between the central portion 18 and the retaining flange 20. The flexible, resilient material used to construct the clip and/or the flexability of the tubing allows that unenclosed area to expand somewhat as the rubber tubing is pressed into place. The flexibility of the rubber tubing allows it to also be compressed somewhat, facilitating the positioning of the rubber tubing in the clip.

In the embodiment of the invention described and illustrated in FIGS. 1 through 3 the clip bends the tubing through a 90 degree angle. The invention can likewise be used to bend otherwise straight rubber tubing through an angle of 45° to 180° (U-shaped bend).

The foregoing disclosure and drawings are merely illustrative of the invention and are not intended to limit the invention to the disclosed embodiments. Reasonable variation and modification are possible with-in the scope of the foregoing disclosure and drawings without departing from the spirit of the invention.

The embodiments of the invention in which an exclusive property or privilege is claimed are defined as follows:

1. A tubing angle bend assembly, comprising:
   a length of flexible tubing;
   a clip integrally formed in one piece of a resilient plastic material mounting said length of tubing and bending said tubing through a pre-selected angle, said clip comprising:
   a body of arcuate configuration and having a central portion flanked by end portions, a tangent at the end of said end portions substantially defining said pre-selected angle, said central portion forming a substantially continuous spine on an inner radial surface thereof;
   resilient retaining means on said end portions extending radially inwardly defining a partial tubular passage for said tubing and for retaining said tubing in resilient fit relationship against said spine in said partial tubular passage, said retaining means having end portions defining a first access opening for resilient passage of said tubing therebetween into said tubular passage; and
   a resilient central retainer flange extending radially inwardly and beneath said tubing to define a partial tubular passage for said tubing and to maintain said tubing in firm contact with said spine without collapsing said tubing, said retainer flange having an end portion defining a second access opening less than the diameter of said tubing to allow resilient passage of said tubing therethrough into said tubular passage;
   whereby said tubing can be quickly mounted into said clip by passing said tubing through said first and second access openings and retained against said spine by said retaining means and said central retainer flange to smoothly bend said tubing through said pre-selected angle.

2. A tubing angle bend assembly according to claim 1 wherein said body is arcuate shaped in cross-section and has a radius of curvature substantially the same as the radius of curvature of the outer surface of said length of flexible tubing.

3. A tubing angle bend assembly according to claim 2 wherein said retaining means are formed by a pair of flanges which together with said body extend more than 180 degrees around said tubing.

4. A tubing angle bend assembly according to claim 3 wherein said central retainer flange and said body extend more than 180 degrees around said tubing.

5. A tubing angle bend assembly according to claim 4 wherein said body central portion has an opening juxtaposed to said central retainer flange to facilitate molding of said flange.

6. A tubing angle bend assembly according to claim 2 wherein said central retainer flange and said body extend more than 180 degrees around said tubing.

7. A tubing angle bend assembly according to claim 6 wherein said body central portion has an opening juxtaposed to said central retainer flange to facilitate molding of said flange.

8. A tubing angle bend assembly according to claim 2 wherein said body central portion has an opening juxtaposed to said central retainer finger to facilitate molding of said finger.

9. A tubing angle bend assembly according to claim 1 wherein said retaining means are formed by a pair of flanges which together with said body extend more than 180 degrees around said tubing.

10. A tubing angle bend assembly according to claim 9 wherein said central retainer flange and said body extend more than 180 degrees around said tubing.

11. A tubing angle bend assembly according to claim 9 wherein said body central portion has an opening juxtaposed to said central retainer flange to facilitate molding of said flange.

12. A tubing angle bend assembly according to claim 1 wherein said central retainer flange and said body extend more than 180 degrees around said tubing.

13. A tubing angle bend assembly according to claim 12 wherein said body central portion has an opening juxtaposed to said central retainer flange to facilitate molding of said flange.

14. A tubing angle bend assembly according to claim 1 wherein said body central portion has an opening juxtaposed to said central retainer flange to facilitate molding of said flange.

15. A tubing angle bend clip integrally formed of a resilient plastic material and adapted to mount a length of flexible tubing and bend said tubing through pre-selected angle, comprising:

a body of arcuate configuration and having a central portion flanked by end portions, a tangent at the end of said end portions substantially defining said pre-selected angle, said central portion forming a substantially continuous spine on an inner radial surface thereof;

resilient retaining means on said end portions extending radially inwardly defining a partial tubular passage and for retaining said tubing in resilient fit relationship against said spine, said retaining means having end portions defining a first access opening for resilient passage of said tubing therebetween into said partial tubular passage; and a resilient central retainer flange extending radially inwardly to define a partial tubular passage and for maintaining said tubing in firm contact with said spine without collapsing said tubing, said retainer flange having an end portion defining a second access opening less than the diameter of said tubing for allowing resilient passage of said tubing therethrough into said partial tubular passage;

whereby tubing can be quickly mounted into said clip by passing the tubing through said first and second access openings, and said tubing is thereby retained against said spine by said retaining means and said central retainer flange and smoothly bent through said pre-selected angle.

* * * * *